United States Patent [19]

Talluri et al.

[11] Patent Number: 5,552,825
[45] Date of Patent: Sep. 3, 1996

[54] COLOR RESOLUTION ENHANCEMENT BY USING COLOR CAMERA AND METHODS

[75] Inventors: Rajendra K. Talluri; Bruce E. Flinchbaugh, both of Dallas, Tex.

[73] Assignee: Texas Instruments Incorporated, Dallas, Tex.

[21] Appl. No.: 335,928

[22] Filed: Nov. 8, 1994

[51] Int. Cl.⁶ .................................................. H04M 5/228
[52] U.S. Cl. ......................... 348/222; 348/234; 348/239; 348/712; 348/413
[58] Field of Search .................................... 348/222, 234, 348/239, 240, 704, 712, 405, 416, 413; 358/909.1; H04N 5/228, 5/262, 3/223

[56] References Cited

U.S. PATENT DOCUMENTS

| | | | |
|---|---|---|---|
| 4,912,558 | 3/1990 | Easterly | 348/223 |
| 5,001,560 | 3/1991 | Ericsson | 348/413 |
| 5,008,739 | 4/1991 | D'Luna | 348/254 |

Primary Examiner—James J. Groody
Assistant Examiner—Sherrie Hsia
Attorney, Agent, or Firm—W. Daniel Swayze, Jr.; W. James Brady, III; Richard L. Donaldson

[57] ABSTRACT

A color resolution enhancement method and enhanced color cameras (600) with a single CCD detector (606) having attached color filters (604) and using luminance-based gradient interpolation to fill in color channels. A color camera, includes an image detector, the detector with sets $S_1, S_2, \ldots S_N$ of pixels for N, an integer greater than 1, where pixels in the set $S_J$ detect radiation in a corresponding sampled channel $C_J$ for each J in the range 1 to N, a channel reconstructor coupled to an output of the detector. The reconstructor includes a luminance generator which combines the sampled channels $C_1, C_2, \ldots C_N$ to a luminance channel, a gradient generator coupled to an output of the luminance generator and which transfers the luminance channel to a gradient channel, and a directional interpolator coupled to an output of the detector and to an output of the gradient generator and which transfers each of the sampled channels $C_1, C_2, \ldots C_N$ to a corresponding reconstructed channel $RC_1, RC_2, \ldots RC_N$, and a reconstructed channel output.

10 Claims, 18 Drawing Sheets

COLOR RESOLUTION ENHANCEMENT BY USING COLOR CAMERA AND METHODS

BACKGROUND OF THE INVENTION

The invention relates to electronic devices, and, more particularly, to color cameras and methods.

Color video cameras can use various type of color image detectors. Single-detector color image detectors avoid the optical complexity and problems with image registration of multiple detector setups, such as with three detectors: one for each of the primary colors. However, the single detector color imaging has difficulties because at least three distinct types of color information must be extracted from the single detector. Known approaches include using a color wheel in front of the single detector to time modulate the frequency bands sensed. More commonly, a color filter array in front of the single detector permits a pixel to be illuminated by only a selected band of frequencies. Examples of color filter arrays include (1) repeating interlaid patterns of one luminance filter and two chrominance filters as illustrated in FIGS. 1A–B of U.S. Pat. No. 3,971,065 and (2) parallel vertical red, green, and blue alternating striped color filters superimposed on the single image detector which is scanned horizontally. The single detector in these setups may be charge coupled devices (CCDs) or other such devices.

In particular, FIGS. 1a–c heuristically shows a camera having a CCD array detector with parallel red, green, and blue stripe filters one pixel wide and running vertically. FIG. 1a shows in perspective view generic camera elements: a lens for focussing an image on the CCD as suggested by representative light rays plus control, memory, and readout electronics. The camera may be a still camera (one image created per camera activation) or a real time video camera (a continuous stream of images). FIG. 1b shows in plan view the CCD with an image area of 488 rows by 754 columns of pixels, a column output multiplexer, and three output shift registers with an output buffer. FIG. 1c illustrates a portion of the CCD image area showing columns of pixels between channel stops and with a red, green, or blue stripe filter over each column. The CCD operates as follows: first during an integration time period the clocked gates are biased high and photons passing through a filter and a clocked gate are absorbed in a potential well in the underlying silicon (forming one pixel) and generate electron-hole pairs with the electrons trapped in the potential well. Next, during a readout time period each packet of trapped electrons is successively transferred from its original potential well to an adjacent potential well under a virtual gate (solid arrows), and then from the potential well under the virtual gate to the next potential well under a clocked gate (broken arrows) by toggling the clocked gates between high and low biases. At the end of each set of three columns a multiplexer transfers the charge packets from a column to the appropriate one of three output shift registers. Thus for each color channel (images of a single color) the CCD samples only every third (horizontal) pixel, and this limited sampling in the color channels diminishes the horizontal resolution and demands interpolation in each color channel for reconstruction to approximate the original full color image. However, even with interpolation, the reconstructed image loses horizontal resolution. For example, FIGS. 2a–c show, respectively, an input image which is mostly red, the three color channels as sampled (the dark columns are the small intensity green and blue portions of the image), and the reconstructed color channels using bilinear interpolation. Loss of horizontal resolution stands out.

The same need for interpolation exists in any color filter array geometry, and known camera systems typically use a non-ideal lowpass filter for the reconstruction. This non-ideal reconstruction introduces unacceptable visible artifacts into the final image such as aliasing, Moire patterns, ringing, anisotropic effects, and sample frequency ripple. To overcome these artifacts, most camera systems employ some form of optical prefiltering to limit the high spatial frequency content of an image prior to sampling. This results in a blurry image and reduced image resolution. To improve image resolution, some camera systems compute the high spatial frequency luminance from the interpolated color channels and add this to the color channels to improve high spatial frequency performance, but this still leads to poor images.

Various interpolation methods for artificial zoom and other fillings for missing pixels exist. For example, Thurnhofer et al, Adaptive interpolation of images with application to interlaced-to-progressive conversion, 2094 Proc. SPIE 614-625 (1993), uses a local gradient analysis for a directional interpolation to generate filling pixels such as in artificial zoom and interlaced field to full field. Nevertheless, such reconstruction approaches still lack the resolution required in many applications.

Many approaches exist for pattern classification. For example, decision trees based on characteristics derived from input images, such as object diameter, fill factor, and so forth, have been used for image classification. Similarly, multilayer perceptrons (or neural networks generally) learn associations by training with known classified input images. See Lippmann, "An introduction to computing with neural nets", in Neural Networks: Theoretical Foundations and Analysis (C. Lau, ed., IEEE Press, New York 1991).

SUMMARY OF THE INVENTION

The present invention provides color cameras and color image interpolation methods which use local information from all colors for each color channel interpolation. Preferred embodiments include cameras with both adaptive interpolation and local pattern recognition interpolation. This interpolation may be used for color filter array single detector color imagers and cameras to reconstruct color channel images using information from all three channels for each channel's interpolation.

The interpolation in a color channel using information from other color channels has an advantage of more accurate reconstruction and improved resolution.

BRIEF DESCRIPTION OF THE DRAWINGS

The drawings are schematic for clarity.

DESCRIPTION OF THE PREFERRED EMBODIMENTS

Overview

Figure 1A:
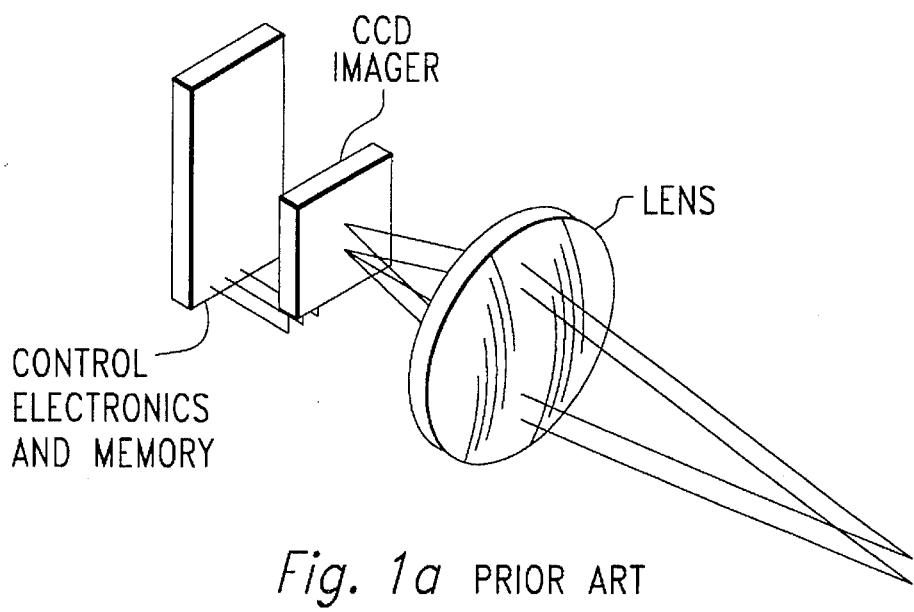
FIGS. 1a–c show a CCD with a vertical stripe color filter attached.
Figure 1B:
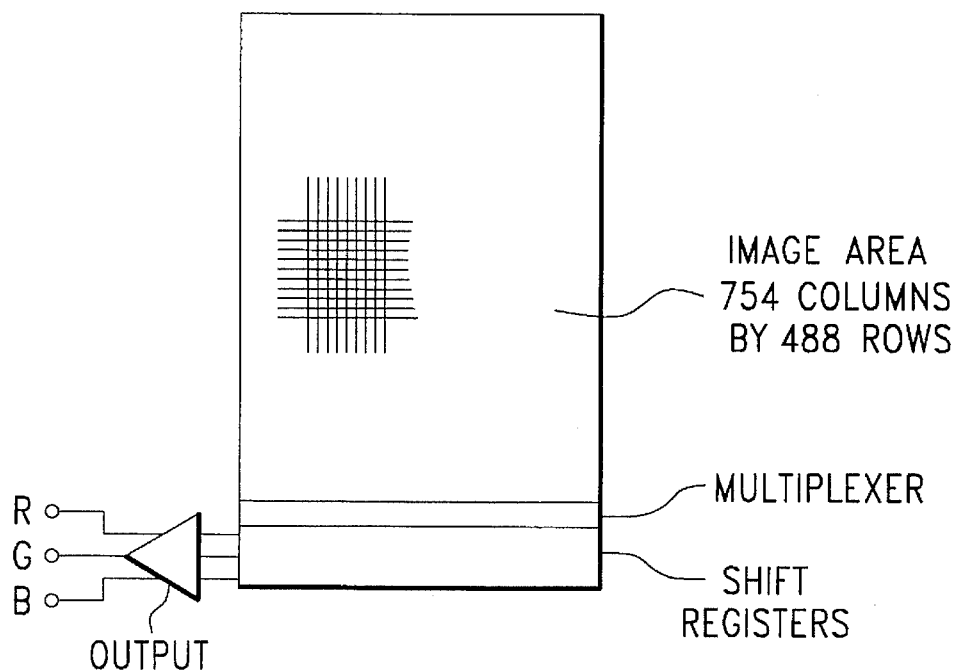
Figure 1C:
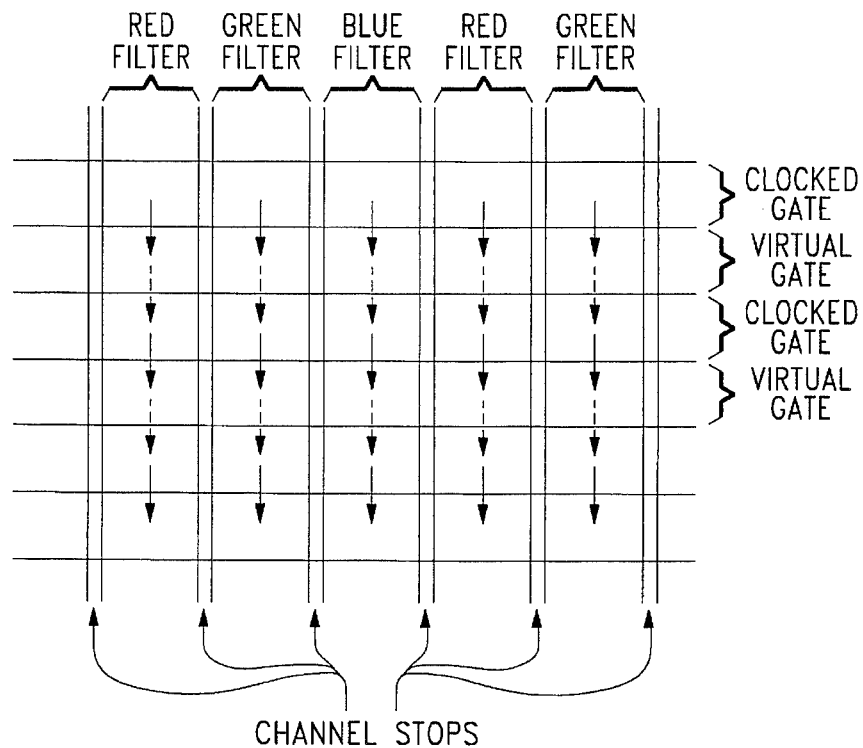
Figure 3:
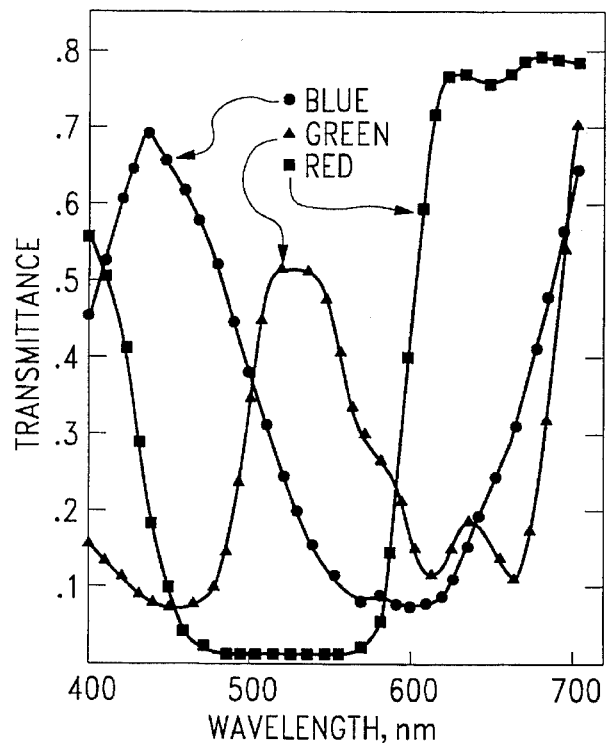
FIG. 3 illustrates filter material transmittance.

FIG. 3 shows the spectral transmittance of typical red, green, and blue filter materials of a color filter array which could be in the form of vertical stripes of filter material affixed to a CCD as illustrated in FIG. 1c. For example, the CCD detector could have active pixels arranged into 484 rows by 755 columns and a vertical stripe color filter array of interlaced columns: each color covers 251 or 252 columns. As FIG. 3 illustrates, the transmittances of the three color filter materials have frequency overlap, so the green and blue pixels that are sensed between every two consecutive red pixels have some information about the corresponding missing red color channel pixels. Similarly, the red and blue pixels sensed between consecutive green pixels contain green information, and the red and green pixels sensed between consecutive blue pixels have blue information. The preferred embodiment interpolation methods exploit this information of one color found in the pixels filtered for the other colors. Furthermore, image features such as sharp edges will usually appear in all three colors, so even with perfect filters there would likely be information in one sampled color channel which is useful in the other sampled color channels.

Figure 4:
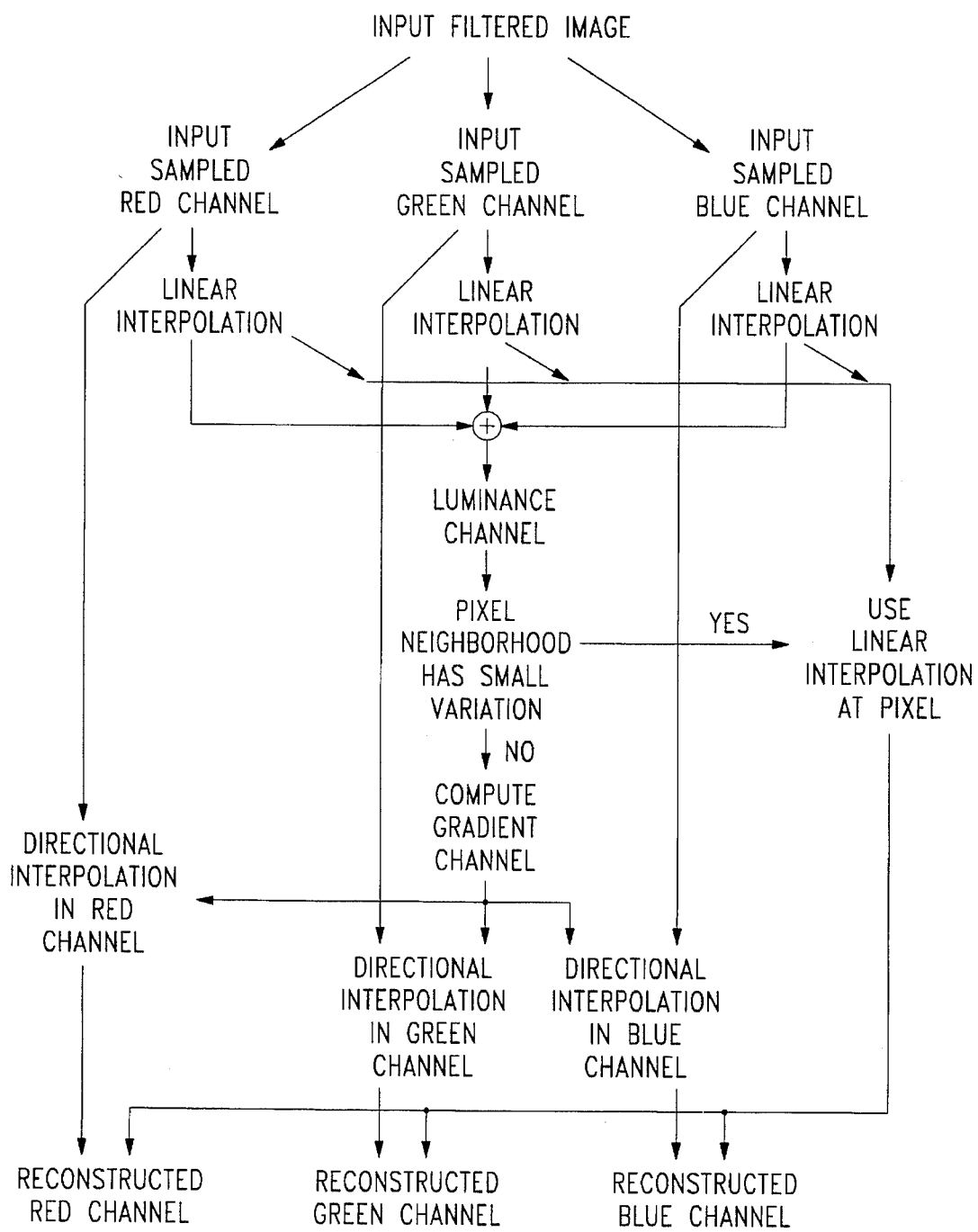
FIGS. 4–5 are flow charts for two perferred embodiments.

In particular, the first preferred embodiment method uses an adaptive directional interpolation with information from all three color channels in each color channel's reconstruction interpolation as follows. First, for each sampled color channel do a preliminary linear interpolation (horizontal) to fill in the missing two-thirds of the pixels; this yields three full images: one interpolated color channel from each sampled color channel. Second, form a high frequency luminance channel (image) by adding weighted values of the corresponding pixels of the three interpolated color channels. Next, compute the gradient channel of the high frequency luminance channel. Then, for each pixel in each of the three original sampled color channels, if most pixels in a neighborhood have a roughly common gradient in the high frequency luminance channel (image), interpolate at this pixel in a direction perpendicular to the common gradient at this pixel. Otherwise, for a pixel without a common gradient, use the linear interpolation (horizontal) for each of the two color channels with this pixel as an unsampled pixel. In short, if the high frequency luminance channel image has a common gradient in a neighborhood of a pixel, then use this gradient for directional interpolation in the color channels; otherwise use the linear (horizontal) interpolation already computed. FIG. 4 is a flow chart for this interpolation which adapts to any common high frequency luminance gradient.

Figure 5A:
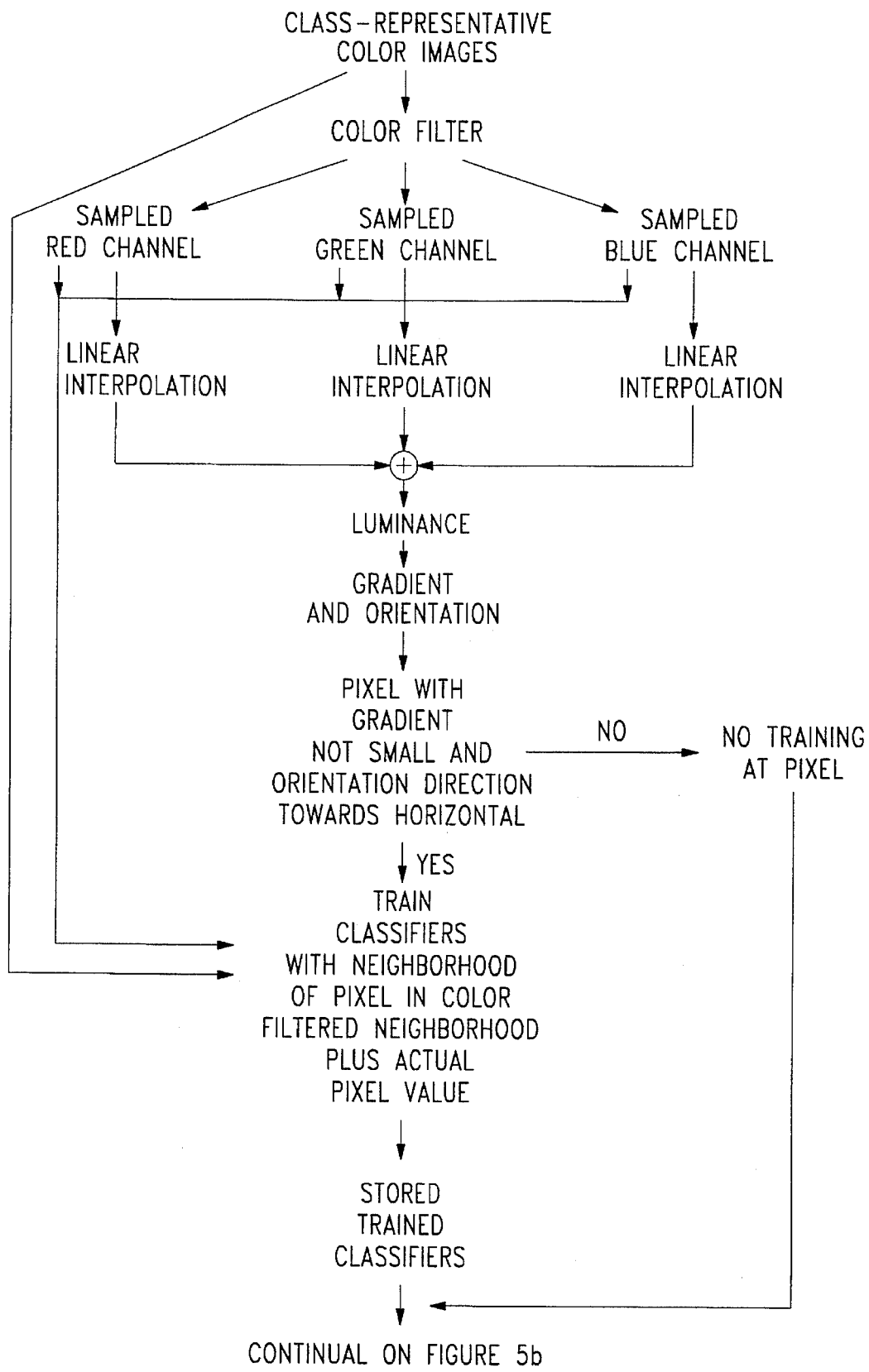
Figure 5B:
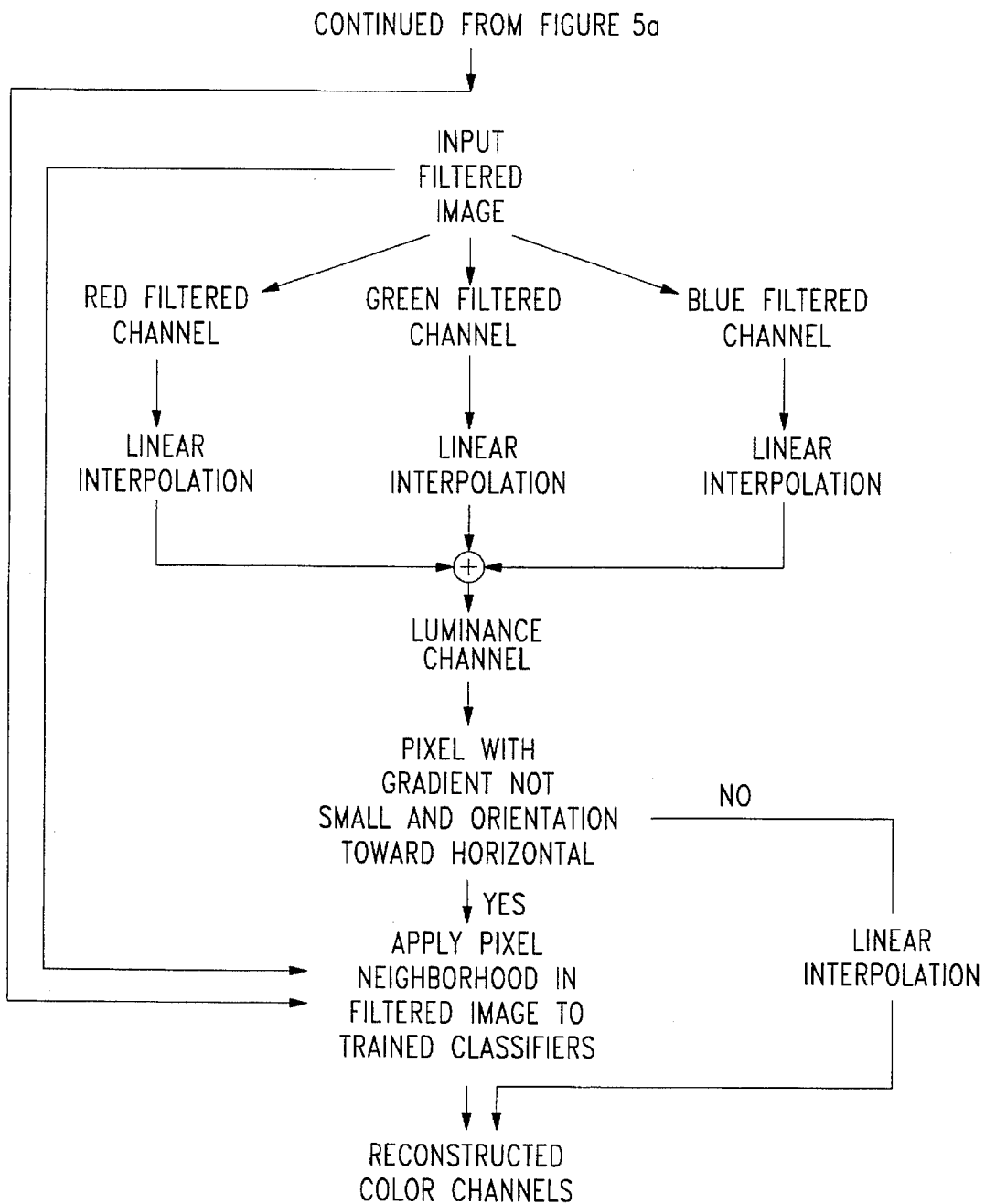

A second preferred embodiment method interpolates the color channels by treating the interpolation as a pattern recognition problem. For example, interpolating the red pixels uses the information in the green and blue pixels that were sampled between sampled red pixels by presuming an interdependence of the color information among the three color channels is a non-linear function of various parameters including the spectral characteristics of the surfaces of the objects being imaged, the lighting, and the color filter responses. But rather than attempting to derive the complex functional relationship, restrict the class of images being considered and then look at a representative set of images for this class. Train a pattern classifier that uses supervised learning, such as a multi-level perceptron or a decision tree classifier, to capture the interdependence of the color channels in a domain specific fashion. This trained classifier then provides the interpolation of missing pixels in each color channel using the information of the other two color channels. FIG. 5 is a flow chart for the trained classifier interpolation.

Camera with interpolation

Figure 6:
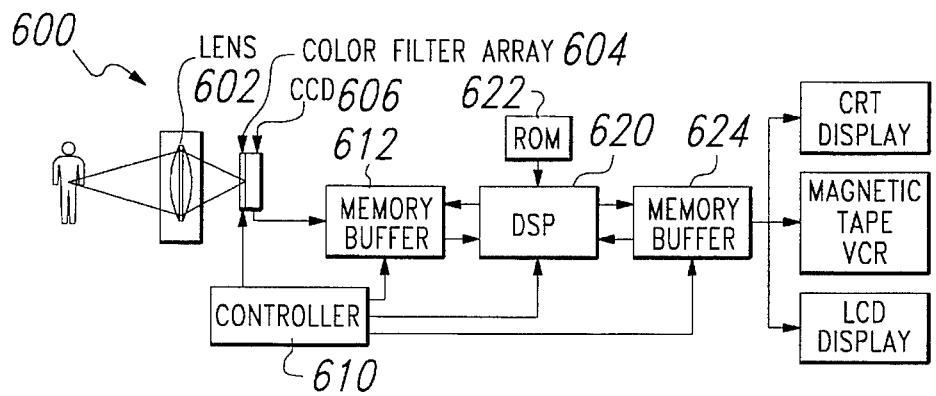
FIG. 6 shows a preferred embodiment system in block format.

FIG. 6 schematically shows a first preferred embodiment camera 600 which incorporates the preferred embodiment interpolation methods. In particular, lens 602 (which may be autofocussing or manually focussed) focusses light from an object through color stripe filter array 606 onto silicon CCD detector 604. Controller 610 clocks the CCD and controls buffer memory 612 to store the outputs of the CCD; digital signal processor 620 performs the interpolations and stores the full color images in buffer memory 624 which then transfers the images to one or more output devices such as an LCD, CRT, or magnetic videotape. Controller 610 synchronizes data transfers, and ROM 622 contains constants used for interpolations. The various functions performed could be realized as specialized circuitry or as programmed general purpose circuitry as in FIG. 6. Indeed, controller 610 may be simply a stored program in DSP 620 and not separate hardware. The buffer memories could be omitted or incorporated into DSP 620 or the output devices.

The pattern recognition method would have offline training to develop the interpolation classifiers, which would be stored as a lookup table in ROM 622. Indeed, such ROMs could be replaceable so that the camera could be adapted to the class of objects being detected.

Adaptive directional interpolation

Figure 7:
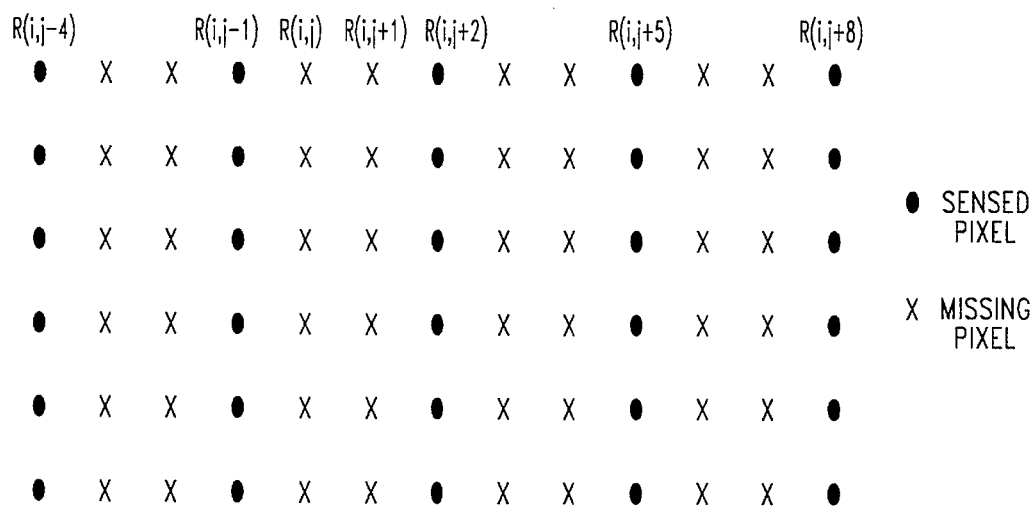
FIG. 7 illustrates pixels for interpolation.

The first preferred embodiment method interpolates the red, green, and blue channels (single images or image streams) in similar manners, so only the red channel interpolation need be described and proceeds as follows. FIG. 7 shows a 6 by 13 array of pixels with pixels sampled by the red filter indicated by filled circles and pixels sampled by green and blue filters indicated by Xs; that is, the sampled red channel consists of every third (horizontal) pixel and is the data interpolated. The pixel locations are labelled by row $i$ and column $j$. The sampled red pixels have columns labelled $j-4$, $j-1$, $j+2$, and $j+5$ and values $R(i,j-4)$, $R(i,j-1)$, and so forth. A first preliminary horizontal linear interpolation creates red pixel values $R(i,j-3)$, $R(i,j-2)$, $R(i,j)$, and so forth which are for pixel locations originally sampled by green or blue filters. The linear horizontal interpolation is given by:

$$R(i,j) = (2R(i,j-1) + R(i,j+2))/3 \quad \text{and}$$

$$R(i,j+1) = (R(i,j-1) + 2R(i,j+2))/3$$

This defines the preliminary red channel.

Analogously, define the preliminary green and blue channels, $G(i,j)$ and $B(i,j)$, respectively, by linear interpolation, for all $i,j$. Then form the high frequency luminance image, denoted by $Y(i,j)$, by:

$$Y(i,j)=aR(i,j)+bR(i,j)+cB(i,j)$$

where a, b, and c are positive weights with a+b+c=1. For simplicity, take all the weights equal to ⅓, although other weights may be preferable depending upon the color filter materials, CCD sensitivity, and so forth.

Next, for each pixel (i,j), compute the local variation of Y(m,n) by taking the difference between the maximum of Y(m,n) and the minimum of Y(m,n) over a 5 by 5 array of pixels centered at (i,j). If this local difference of Y(m,n) is less than 10% of the difference between the global maximum of Y(m,n) and the global minimum of Y(m,n) over the entire image, then pixel (i,j) is deemed to be in a locality without clear features, and the linear horizontal interpolation R(i,j) is used for the final red channel. Of course, measures of variation other than 5 by 5 local variation being at least 10% of global variation could be used, such as 5% or 15% etc. of global variation, and 4 by 4 or 6 by 6 etc. local neighborhoods. That is, the threshold for applying directional interpolation may be defined in various ways.

However, if the difference of local maximum and minimum of Y(m,n) is at least 10% of the difference of the global maximum and minimum of Y(m,n), then use a directional interpolation for the reconstructed red channel at (i,j) as follows. First, use Y(m,n) to compute a gradient at every pixel in the 5 by 5 array centered at (i,j) by convolution with a gradient operator, for example the Sobel operators for the gradient components and which have matrices:

```
-1  -2  -1      -1   0   1
 0   0   0      -2   0   2
 1   2   1      -1   0   1
```

Figure 8A:
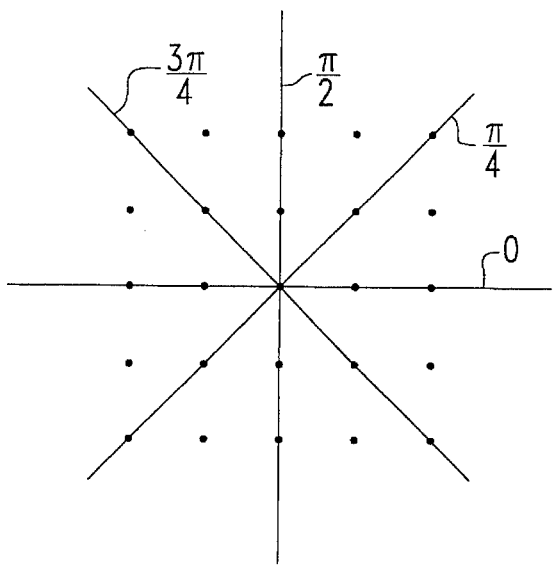
FIGS. 8a–b show quantized gradient directions.
Figure 8B:
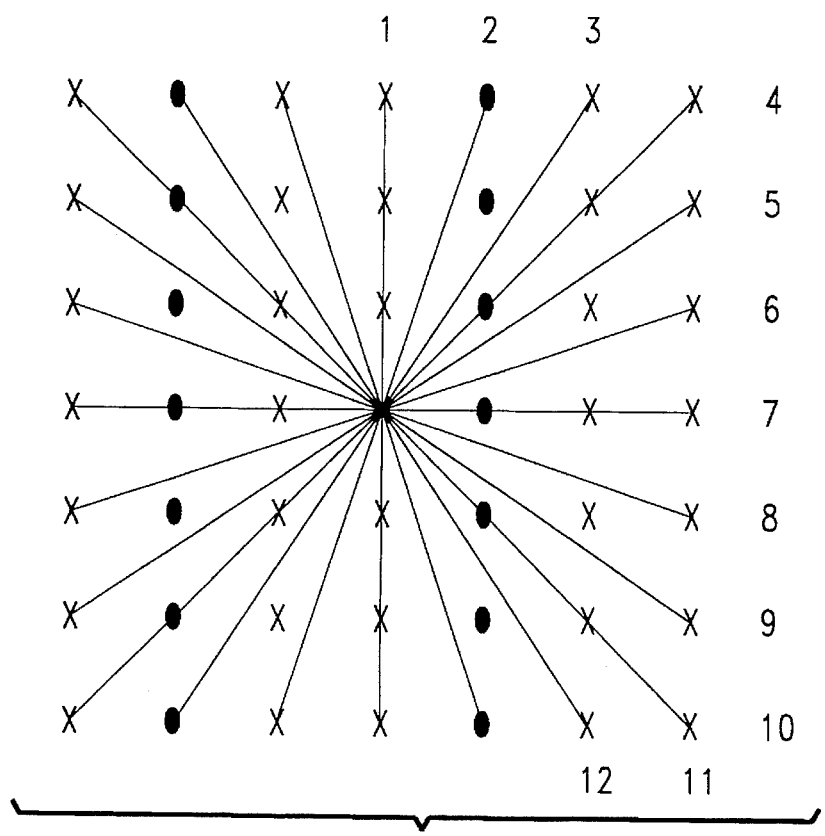

Then quantize each of the 25 luminance gradients to one of the four luminance gradient directions illustrated in FIG. 8a for the center pixel. Alternatively, a finer direction quantization such as shown in FIG. 8b could be used.

When at least 13 of the 25 quantized luminance gradient directions are the same, use the perpendicular to this dominant luminance gradient direction as the direction for linear interpolation to find the final red channel pixel value at (i,j). This use of a dominant luminance gradient direction provides some noise immunity. Contrarily, with no dominant luminance gradient direction (less than 12 of the 25 are in any one direction), use the quantized luminance gradient direction at the (i,j) pixel alone, and interpolate perpendicularly to this gradient direction as described in the following. Note that a dominant luminance gradient direction indicates a local feature such as an edge, and interpolation along the edge should be the best approach. However, with no dominant luminance gradient direction, the locale of pixel (i,j) may include corners or fine texture features.

Figure 9A:
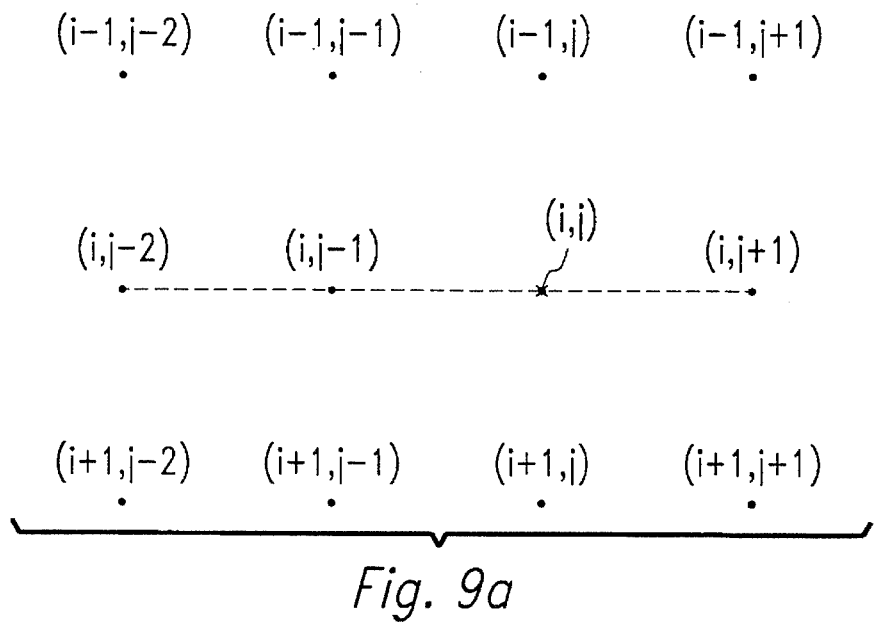
FIGS. 9a–d illustrate interpolation by the first preferred embodiment interpolation.
Figure 9B:
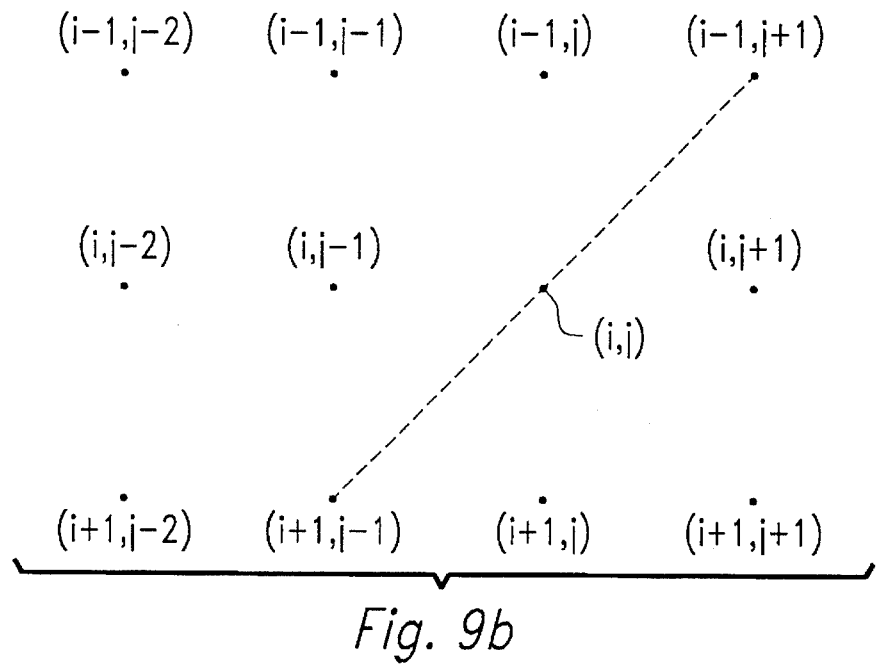
Figure 9C:
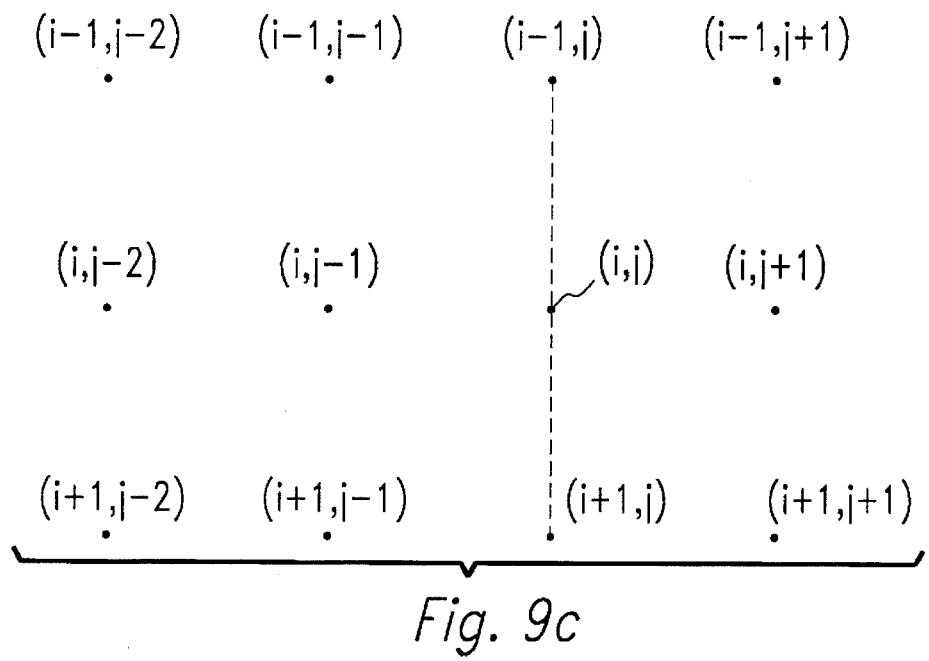
Figure 9D:
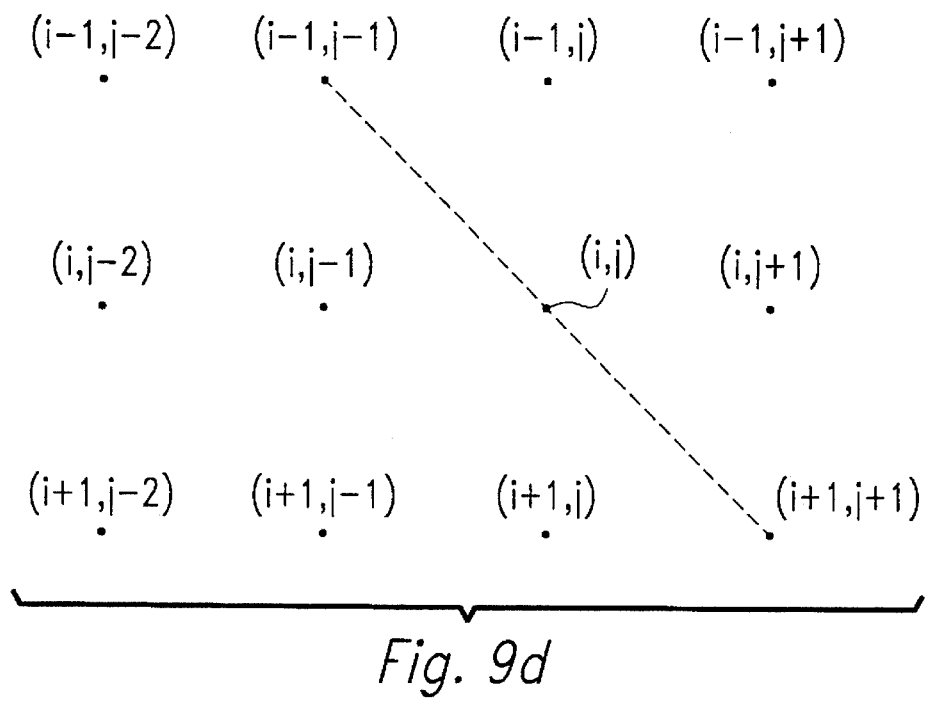

In particular, FIG. 9a shows a 3 by 4 array of pixels about missing red channel pixel at (i,j): the pixels in columns j−2 and j+1 were sampled for the red channel, column j−1 for the green channel, and column j for the blue channel, and the broken line at angle 0 is the line perpendicular to the quantized luminance gradient direction at pixel (i,j) for the quantized luminance gradient direction equal to π/2. Thus any edge through (i,j) will lie roughly along the broken line, and so the interpolation will be along this line. FIGS. 9b–d show the same 3 by 4 array with quantized luminance gradient perpendicular lines having angles of π/4, π/2, and 3π/4.

The interpolation is a weighted average of the sampled red channel pixel values at pixel locations (i,j+1) and (i−2,j) along the broken line:

$$R(i,j)=(2*R(i,j+1)+R(i,j−2))/3$$

where R(m,n) is the sampled red channel pixel value at pixel location (m,n) and * denotes multiplication. This interpolation weights the sampled red channel pixel values according to their distance from the interpolated pixel.

For the perpendicular to the dominant quantinzed luminance gradient direction at π/4, as illustrated by the broken line in FIG. 9b, the interpolation first computes a weighted average of the sampled red channel pixels at (i+1,j−2) and (+1,j+1) to give a temporary value R1 for pixel (i+1,j−1) and then linearly interpolates this weighted average with the sampled red channel pixel value at (i−1,j+1). Indeed, set:

$$R=(2*R(i+1,j−2)+R(i+1,j+1))/3$$

which is analogous to the angle 0 case for R(i+1,j−1), and then set:

$$R(i,j)=(R(i−1,j+1)+R)/2$$

which is just equal weight interpolation along the broken line.

For the perpendicular at π/2 as illustrated in FIG. 9c, the interpolation again computes a weighted average of sampled red channel pixel values to define temmporary values at pixels (i−1,j) and (i+1,j) , and then linearly interpolates these weighted averages. In particular, set:

$$R1=(R(i−1,j−2)+2*R(i−1,j+1))/3 \quad \text{and}$$

$$R2=(R(i+1,j−2)+2*R(i+1,j+1))/3$$

Note that both R1 and R2 use red channel samples from two separate columns. The linear interpolation is then:

$$R(i,j)=(R1+R2)/2$$

Lastly, for the perpendicular at 3π/4 as illustrated in FIG. 9d, the interpolation is similar to that for the perpendicular at π/4 with a temporary pixel value at (i−1,j−1). In particular, set:

$$R1=(2*R(i−1,j−2)+R(i−1,j+1))/3$$

and then linearly interpolate:

$$R(i,j)=(R1+R(i+1,j+1))/2$$

The case of interpolating (i,j) with the sampled red channel image pixels in columns j−1 and j+2 (rather than j−2 and j+1 as in the foregoing) is computed analogously by observing that this case is the foregoing case with a rotation by π about the center of the 3 by 4 array; that is, a rotation about a point midway between pixels (i−1,j) and (i,j) in the Figures.

The foregoing applied to all pixels not sampled in the red channel will complete the reconstructed red channel image.

As previously noted, the reconstructed green channel and the reconstructed blue channel are generated by the green and blue analogs to the foregoing red channel reconstruction.

Simple variations of the foregoing interpolations include using pixel neighborhoods other than 3 by 4 for interpolation (so more than just two pixel values would enter the weightings), using pixel neighborhoods other than 5 by 5 for dominant gradient direction, allowing less than half or requiring much more than half of the gradient directions coincide for a dominant direction to exist, and using thresholds other than 10% of the difference of the global maximum and minimum or other using other statistical measures of local and global variation such as standard deviation about mean pixel value. Use of such variations may depend upon factors such as the relative size of the neighborhood to the entire image, the expected contrast, and so forth.

Alternative adaptive directional interpolation

The quantization and analysis of the gradient directions in the adaptive direction gradient interpolation may be replaced by a straightforward linear interpolating perpendicular to the gradient with the closest sampled pixels as follows. First, compute the same luminance and gradients as in the foregoing, and if the gradient at a missing red channel pixel (i,j) is less than a threshold, then do horizontal linear interpolations as before. But if the gradient exceeds the threshold, avoid quantizing the gradient direction and use the full floating-point angle of the perpendicular to the gradient direction for a linear type interpolation.

Figure 10A:
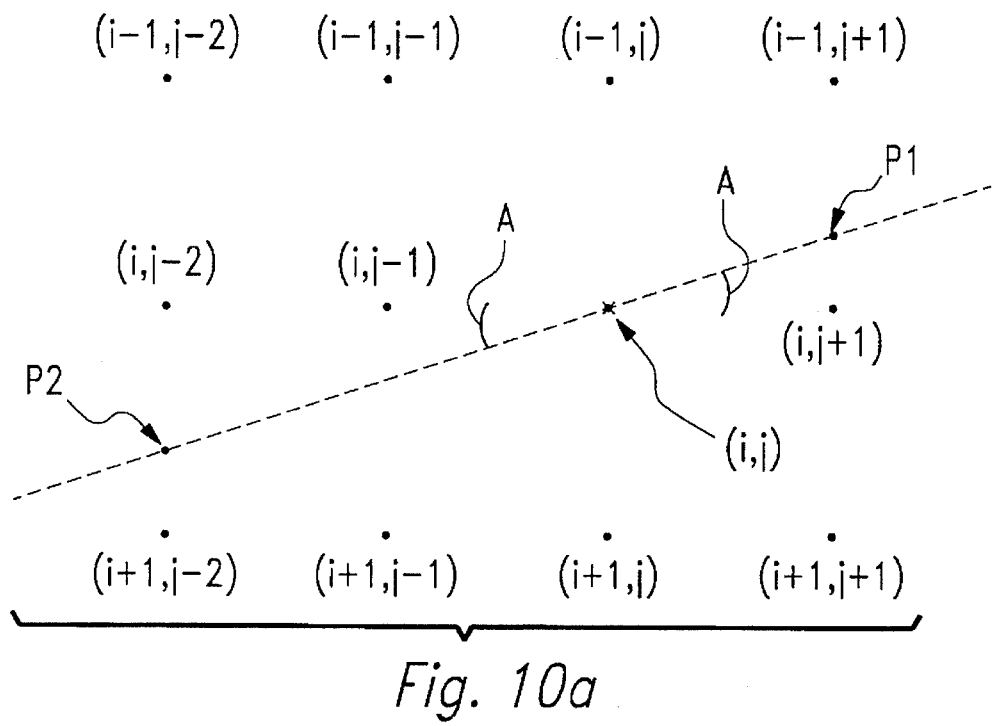
FIGS. 10a–e illustrate interpolation by another preferred embodiment interpolation.

In particular, FIG. 10a shows a 3 by 4 array of pixels about missing red channel pixel at (i,j): the pixels in columns j−2 and j+1 were sampled for the red channel, column j−1 for the green channel, and column j for the blue channel, and the broken line at angle A is the line perpendicular to the luminance gradient direction at pixel (i,j). Thus any edge through (i,j) will lie roughly on the broken line, and so the interpolation will be along this line. FIGS. 10b–e show the array with gradient perpendicular lines having other angles and consequently other interpolation formulae which are described later.

The interpolation initially computes a weighted average of the sampled red channel pixel values at pixel locations (i−1,j+1) and (i,j+1) by:

$$R1 = \tan A * R(i-1,j+1) + (1-\tan A) * R(i,j+1)$$

where R(m,n) is the sampled red channel pixel value at pixel location (m,n), * denotes multiplication, and tanA is the tangent of angle A. Geometrically, tanA equals the distance from pixel location (i,j+1) to the point indicated as P1 in FIG. 10a relative to the distance to pixel location (i−1,j+1). Thus R1 weighs R(i−1,j+1) and R(i,j+1) linearly according the distance of the point P1 to the corresponding pixel location.

Then compute an analogous weighted average R2 of R(i,j−2) and R(i+1,j−2) based on the distance from point P2 as illustrated in FIG. 10a. That is, set:

$$R2 = 2*\tan A * R(i+1,j-2) + (1-2*\tan A) * R(i,j-2)$$

Lastly, take the interpolated red channel pixel value at (i,j) as the linear interpolation of R1 and R2; namely:

$$R(i,j) = (2*R1 + R2)/3$$

This interpolation applies for angles A from 0 up to arctan(½).

Figure 10B:
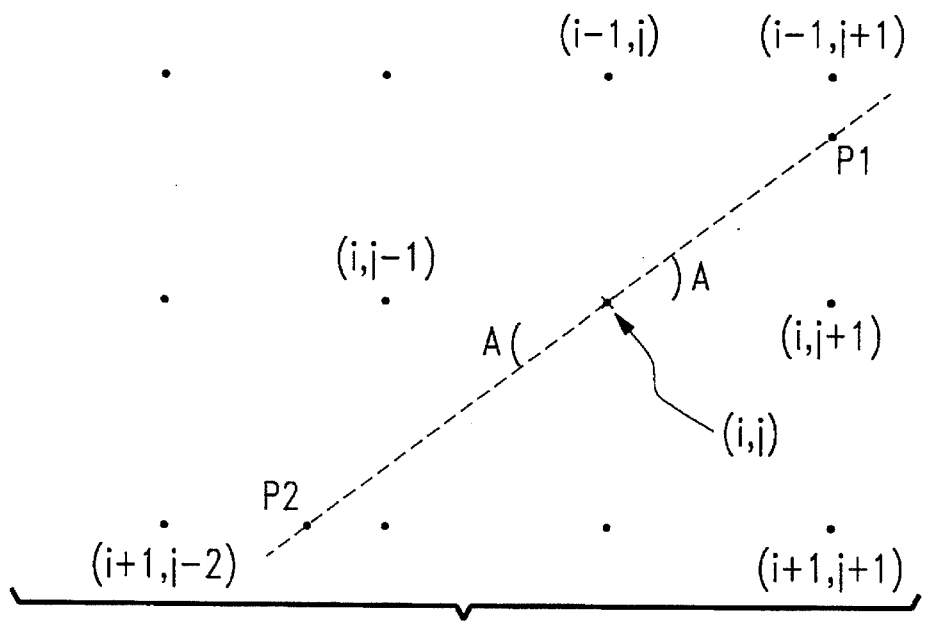

For angles A between arctan(½) and π/4, as illustrated in FIG. 10b, the interpolation again computes a weighted average at points P1 and P2, and then linearly interpolates these weighted averages. Indeed, set:

$$R1 = \tan A * R(i-1,j+1) + (1-\tan A)*R(i,j+1)$$ and $$R2 = ((1+\cot A)*R(i+1,j-2) + (2-\cot A)*R(i+1,j+1))/3$$

where cotA is the cotangent of A. Note that R2 uses red channel samples from two separate columns, and this leads to the following geometrically more involved linear interpolation:

$$R(i,j) = (\cos A * R1 + \sin A * R2)/(\cos A + \sin A)$$

Figure 10C:
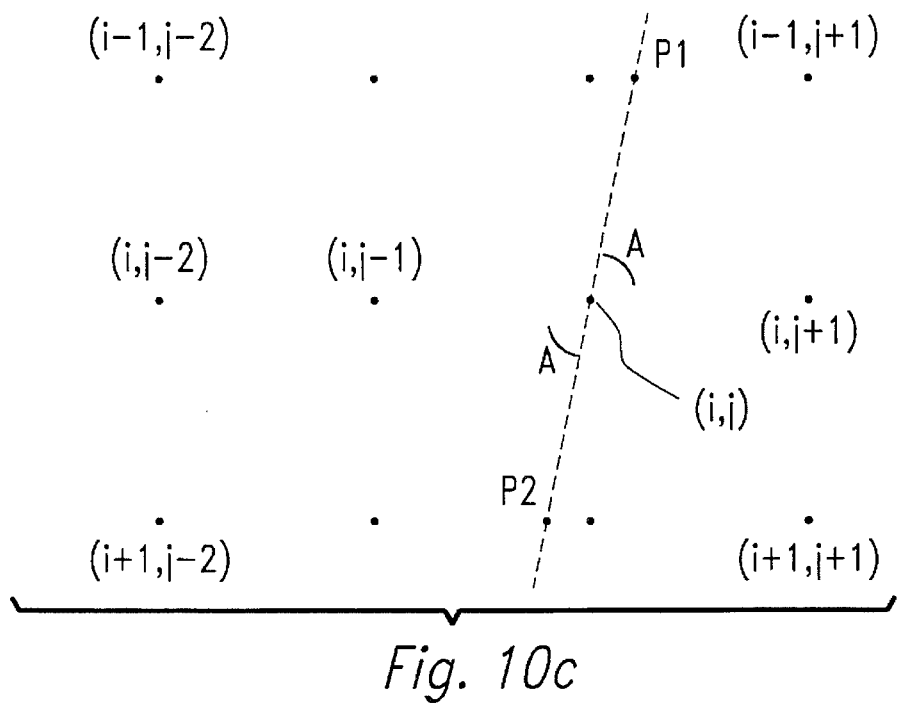

For angles A between π/4 and 3π/4, as illustrated in FIG. 10c, the interpolation again computes a weighted average of sampled red channel pixel values to define values at points P1 and P2, and then linearly interpolates these weighted averages. In particular:

$$R1 = ((1-\cot A)*R(i-1,j-2) + (2+\cot A)*R(i-1,j+1))/3$$ and $$R2 = ((1+\cot A)*R(i+1,j-2) + (2-\cot A)*R(i+1,j+1))/3$$

Note that both R1 and R2 use red channel samples from two separate columns. The linear interpolation is then:

$$R(i,j) = (R1+R2)/2$$

Figure 10D:
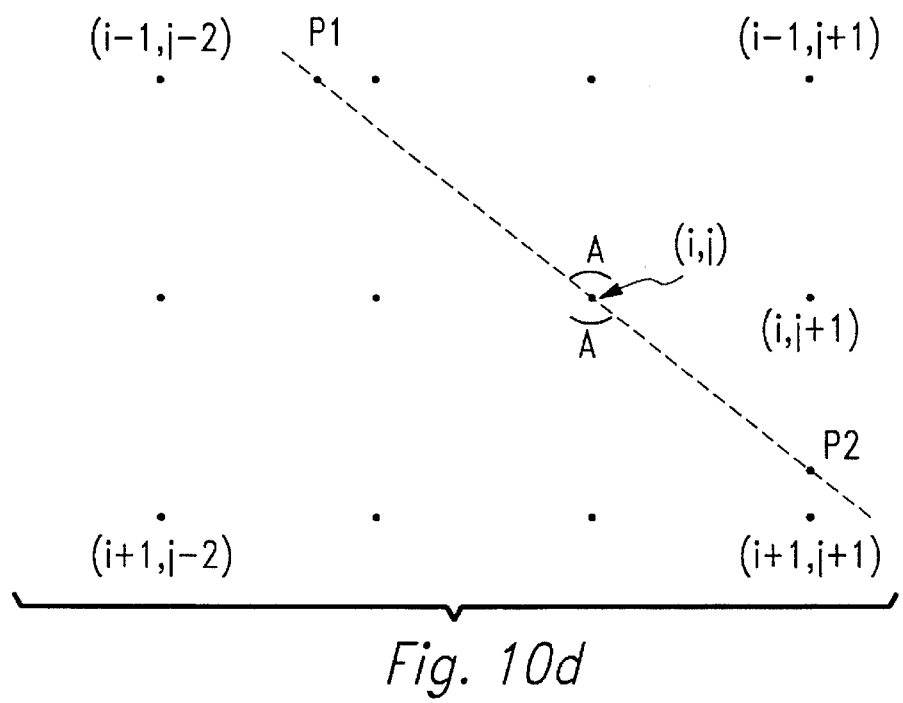

Angles A between 3π/4 and π-arctan(½) are shown in FIG. 10d and the interpolation is symmetrical to that illustrated in FIG. 10b. In particular:

$$R1 = ((1-\cot A)*R(i-1,j-2) + (2+\cot A)*R(i-1,j+1))/3$$ and $$R2 = -\tan A * R(i+1,j+1) + (1+\tan A)*R(i,j+1)$$

Again, only R2 uses red channel samples from two separate columns, and this leads to the following geometrically more involved linear interpolation:

$$R(i,j) = (-\cos A * R1 + \sin A * R2)/(-\cos A + \sin A)$$

Figures 10E, 11:
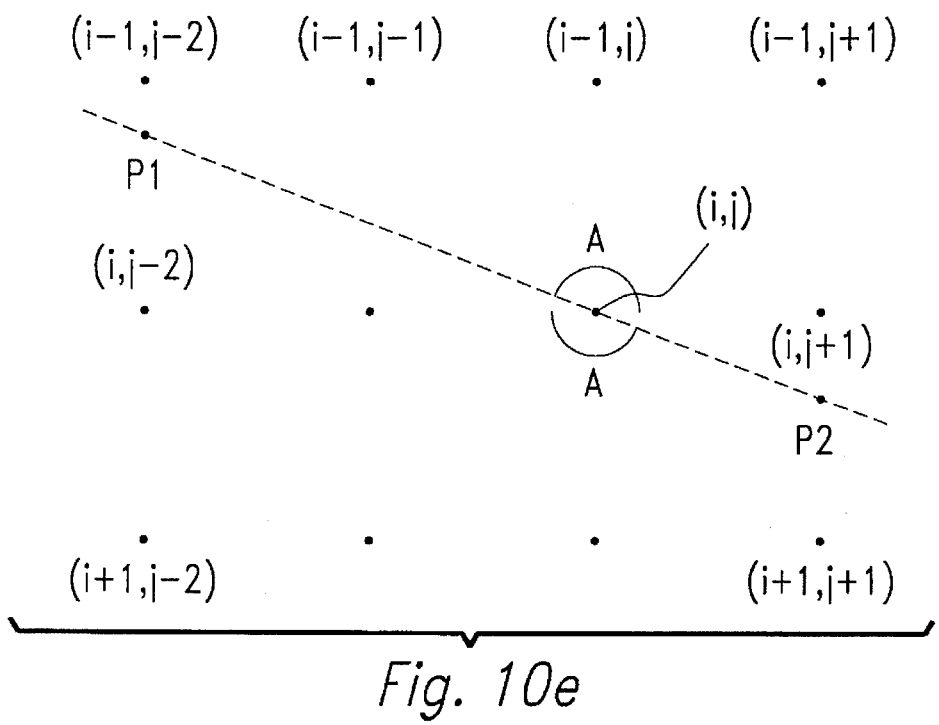
FIG. 11 shows a pixel neighborhood for the second perferred embodiment interpolation.

Lastly, angles A between π-arctan(½) and π are shown in FIG. 10e and the interpolation is symmetrical to that illustrated in FIG. 10a as follows:

$$R1 = -2*\tan A * R(i-1,j-2) + (1+2*\tan A)*R(i,j-2)$$ and $$R2 = -\tan A * R(i+1,j+1) + (1+\tan A)*R(i,j+1)$$

Of course, the interpolated red channel pixel value at (i,j) is the linear interpolation of R1 and R2; namely:

$$R(i,j) = (R1+2*R2)/3$$

The case of interpolating (i,j) with the red sampled pixels in columns i−1 and i+2 (rather than i−2 and i+1 as in the foregoing) is computed analogously by observing that this case is the foregoing case with a rotation by π about the center of the 3 by 4 array; that is, a rotation about a point midway between pixels (i−1,j) and (i,j) in the Figures. This will complete the red channel reconstruction.

Again, the green and blue channel reconstructions are analogous.

The appendix contains a listing in C of this directional interpolation method.

Pattern recognition

The second preferred embodiment reconstruction of the final red, green, and blue channels from the sampled channels does not do a rationalized explicit analysis, but rather considers interpolation as a pattern recognition problem and only applies to an image in a class of images, such as medical images. For a given class of images, the second preferred embodiment trains a pattern classifier that uses supervised learning, such as a multilayer perceptron or a decision tree classifier, to capture the local interdependence of the color channels in a fashion specific to the image class.

In particular, consider the red channel reconstruction for the CCD with vertical striped color filter array as in FIG. 1. FIG. 11 illustrates a 3 by 4 neighborhood of 12 pixels about green sampled pixel (i,j) which needs a red interpolated value. Indeed, the j−1 and j+2 columns are red sampled, the j column is green sampled, and the j+1 column is blue sampled. Thus the neighborhood has information consisting of 12 pixel values: six red pixels, three green pixels, and three blue pixels. The red interpolation for pixel (i,j) will use just these 12 pieces of information without any structural analysis as in the adaptive gradient direction of the foregoing embodiments. Analogously, green and blue interpolations can be done.

A multilayer perceptron with 12 input nodes, a hidden layer of 52 nodes, and 26 output nodes is trained to do the interpolation. The training is restricted to a set of images of the type to generally be interpolated, so the training can capture the local features of such images. (If random pixel value images were considered, then there would be no information in the green and blue channels of any use for the red channel.) The same perceptron will do the red interpolation for all green sampled pixel locations. A separate perceptron will perform the red interpolation for all blue sampled pixels locations. Similarly, four more perceptrons will take care of the green and blue interpolations.

The 12 perceptron inputs are simply the 12 neighborhood pixel (normalized) values (six red pixels, three green pixels, and three blue pixels), and the output nodes correspond to classifying a red pixel into 26 classes, each class just being an interval: the maximum output node determines the value class for an interpolation red pixel, and the interpolated R(i,j) is taken as the representative value for the class.

The training and accuracy of the perceptron may be enhanced by excluding 3 by 4 neighborhoods with only small pixel value variation as measured by the intensity gradient as in the foregoing embodiments. For such small variation neighborhoods, again just use a linear horizontal interpolation.

More explicitly, the perceptron input is the 12-vector of sampled pixel values in the order (i−1,j−1), (i−1,j), (i−1,j+1), (i−1,j+2), (i,j−1), (i,j), . . . , (i+1,j+2). Presume that the color images have 8 bits per color channel, so the pixel values range between 0 and 255. These values are normalized to lie between −1.0 and 1.0. In the training set each input 12-vector consists of the normalized 6 sampled red pixels, 3 sampled green pixels including the (i,.j) pixel, and 3 sampled blue pixels; but the original image is available, so the actual red pixel value at (i,j) is also known and lies in the range 0 to 255. This suggests 255 possible classes for the output interpolated value; but quantizing the 256 possible output values into equally spaced bins of 10 successive values each reduces the complexity of the classification and led to the 26 output nodes for the perceptron. Increasing the number of output classes increases the ability of the perceptron to approximate the missing values more closely; however, the learning time and the size of the training set needed are also increased. Experimentally, the 26 output classes appears a good tradeoff of training time, size of the training set, and also the classification performance.

The effects of reduced sampling due to;the introduction of the color filter array are mainly felt in the high spatial frequency areas of the image. In the low frequency areas of the image a simple linear interpolation does an adequate job of reconstructing the missing pixel values. It is in these high frequency areas that the use of the perceptron (or other pattern classifier) improves the image resolution. One way to detect the high frequency areas of the image is to use a gradient operator and select areas of the image that have a high gradient magnitude. Also, due to the geometry of the vertical stripe filter, those areas of the image that have high frequency transitions that are nearly vertical are affected the most. These areas can be isolated by computing the gradient orientation at each pixel and seleting those pixels that have an orientation between $-\pi/4$ and $\pi/4$.

First preprocess each of the images in the training set to detet these oriented high frequency areas of the images and form the input vectors and the corresponding quantized output classes at these locations. Since most high frequency transitions occur across all the individual color channels, detect the locations of these transistions by performing the image gradient operations not on each of the individual color channels, but on a combination of the three color channels such as the high frequency luminance. The high frequency luminance was described in the foregoing adaptive gradient direction embodiment as the sum Y=aR+bG+cB where R is the red channel, G is the green channel, and B is the blue channel, with a, b, and c positive weights which sum to 1.

In short, the steps involved in forming the training set of images for the perceptron are:

1. Select a representative set of images from the class of images considered.
2. For each selected image simulate the effects of the stripe color filter array by choosing only every third column of each of the red, green, and blue color channels.
3. Perform linear horizontal interpolation to reconstruct missing image pixels in each simulated filtered color channel.
4. Compute the high frequency luminance image Y=aR+bG+cB from the linearly interpolated simulated color channels.
5. Compute the image gradient magnitude, $I_{MAG}$, and orientation, $I_{ORIE}$, at each of the pixel locations in the Y image.
6. For the red channel, at each of the green pixel locations, if the value of $I_{MAG}$ is greater than a (small) threshold and $I_{ORIE}$ is between $-\pi/4$ and $\pi/4$, form the input 12-component vector $I_1, \ldots, I_{12}$ consisting of the normalized red, green, blue pixel values of the 12 pixels of the 3 by 4 neighborhood of the missing pixel location labelled (i,j) in FIG. 11. Retrieve the true red pixel value at (i,j) from the original image and quantize this value into one of 26 classes to form the output corresponding to the input 12-vector. Store the input 12-vector and the output in a file. Similarly, for the red channel and each of the blue pixel locations, and then for the green channel with blue pixel locations and with red pixel locations, and lastly for the blue channel with red pixel locations and with green pixel locations.
7. Repeat step 6 with other images of the representative set to form the training data; two sets of data for each of the three color channels.

Then train six perceptrons; one set of data from step 7 for each of the perceptrons. Note that the training of perceptrons is performed offline before any use for interpolation. Thus the training results can be stored in memory (ROM or EPROM or read into RAM from a portable memory) and the perception thus may be a lookup table rather than a hard-wired perception with modifiable interconnections between nodes.

Contrarily, the perceptron can be simulated in software. Indeed, public domain packages such as "nopt" from the Oregon Graduate Institute provide a flexible set of routines to simulate, test, and train multilayer perceptions of varying configurations and implements a conjugate gradient descent learning algorithm to modify weights during the training stage. Thus the contents for a lookup table perceptron can be generated without the use of any hardware perceptron.

Once the six perceptrons have been trained, image reconstruction proceeds as:

1. Select a stripe color filtered image to reconstruct.
2. Perform linear horizontal interpolation to reconstruct missing image pixels in each color channel.
3. Compute the high frequency luminance image Y=aR+ bG+cB from the linearly interpolated color channels.
4. Compute the image gradient magnitude, $I_{MAG}$, and orientation, $I_{ORIE}$, at each of the pixel locations in the Y image.
5. For each of the color channels, at each of the missing pixel locations, if the value of $I_{MAG}$ is greater than the threshold (used in forming the training set) and $I_{ORIE}$ is between $-\pi/4$ and $\pi/4$, form the input 12-component vector $I_1, \ldots, I_{12}$ consisting of the normalized input filtered pixel values of the 3 by 4 pixel neighborhood including the missing pixel.
6. Select the perceptron trained for color channel and the missing pixel location of step 5, and present the 12-vector from step 5 to the perceptron.
7. Retrieve the output class selected by the perceptron, scale the class value from the range [−1.0, 1.0] back to 0 to 255, and store this output at the corresponding pixel location in the color channel input image at the missing pixel location.

Note that for missing pixels not interpolated in steps 5–7, the linear horizontal interpolation of step 2 remains. In essence, step 5 picks out missing pixels which are near edges running roughly parallel to the filter stripes and which thus need something better than linear horizontal interpolation.

Figure 2A:
FIGS. 2a–c show an image and its filtered and linear interpolated versions.
Figure 2B:
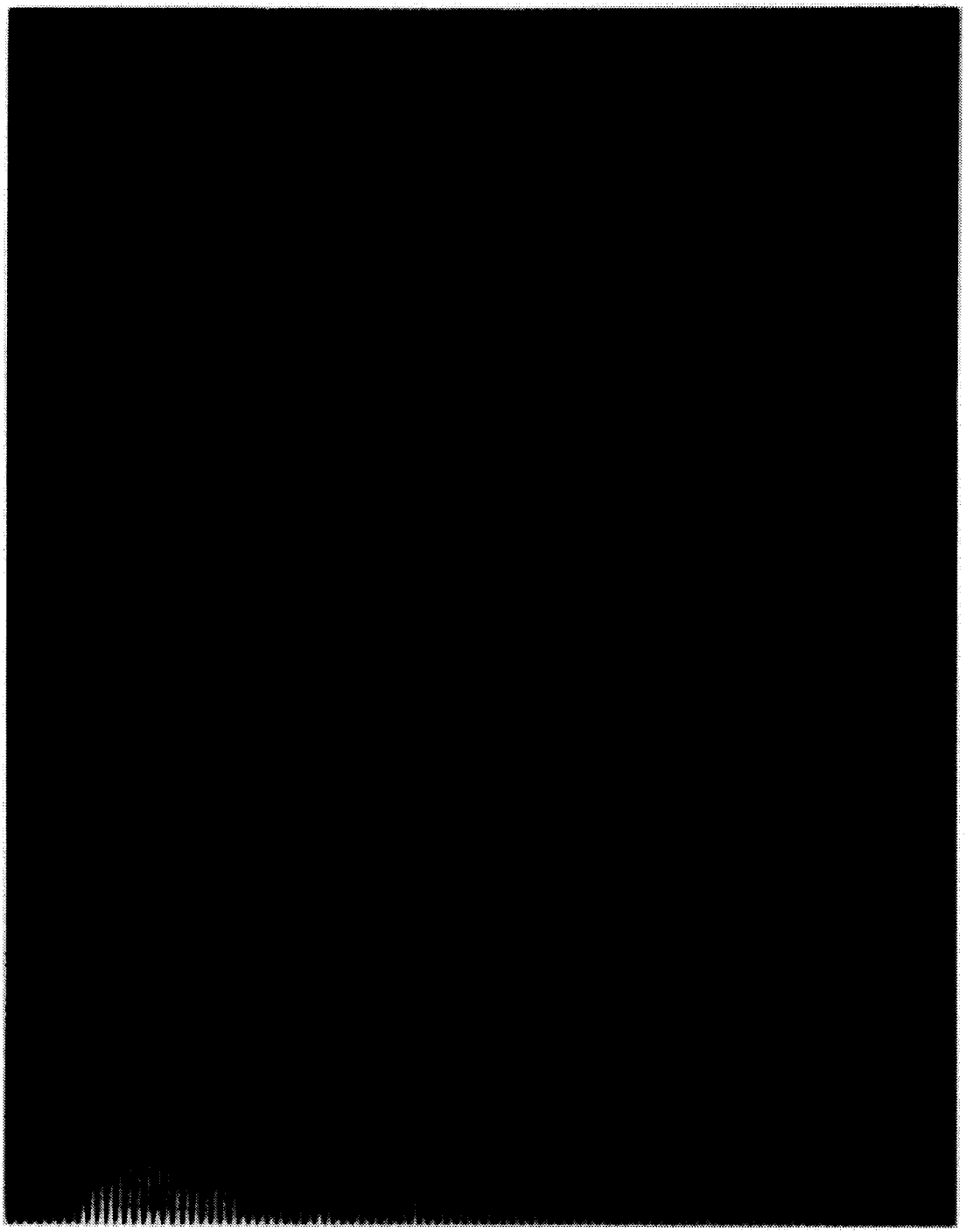
Figure 2C:
Figure 12A:
FIGS. 12a–c illustrates results of the preferred embodiments.
Figure 12B:
Figure 12C:

The FIG. 2a shows an original image which is primarily red; FIG. 2b illustrates the effect of the stripe filter by showing the sum of the three filtered (sampled) color channels with the green and blue channels very weak; and FIG. 2c illustrates the loss of resolution by linear horizontal interpolation of each of the three sampled color channels followed by summing. FIG. 12a shows the luminance image computed from the linear interpolated color channels as in FIG. 2c; and FIG. 12b shows the extracted gradient. FIG. 12c shows the results of reconstruction using perceptron interpolation with perceptrons which had been trained on 18 somewhat similar images. Comparison of FIGS. 2c and 12c suggests perceptron interpolation easily outperforms linear interpolation.

Decision tree Classifiers

Pattern classifiers other than multilayer perceptrons (or neural networks in general) may also be used for the missing pixel interpolation in the color channels of a color filtered image. In particular, trained classification trees have been used to classify patterns based on features extracted from detector data. The preferred embodiment decision tree classifier interpolation method is analogous to the perceptron method in that two decision trees for each color channel are creating from a training set and apply to a 3 by 4 neighborhood of pixels, and only high gradient pixels use the decision tree interpolation with the remaining pixels using linear interpolation; and once trained, the decision trees are applied to high gradient pixel interpolation by use of a 3 by 4 neighborhood about the pixel to interpolated. The features input to the decision trees may be the 12-vector of pixel values from the 3 by 4 neighborhood.

Fabrication

Color CCD cameras with color filters and built-in electronic control and signal processing are standard commercial items. The preferred embodiment color CCD cameras may be made with similar overall hardware but with the electronic control and signal processing hardware (e.g., DSP program, ROM and EPROM) including luminance gradient analysis for interpolation control.

Fabrication

The preferred embodiments may be varied in many ways while retaining one or more of the features of the use of information from multiple sampled (color) channels for interpolation within each (color) channel as with the luminance approach of the first preferred embodiment.

For example, the number of colors sampled may be two or four or more with corresponding filter arrangements. Infrared and ultraviolet may be included, and CCDs or other detectors (such as photodiode and phototransistor arrays) made of various materials such as $Hg_{1-x}Cd_xTe$ and $PbS_{1-x}Se_x$ sensitive to various wavelength photons could be used.

The filter patterns or detector pixel sensitivity areas may be may irregular with interpolation locally dependent upon the filter geometry, and the number of pixels sampled may differ among the various color channels. The linear interpolation for the channels to sum to the luminance may be a higher order interpolation using more than just the two closest sampled pixels to the interpolation pixel and higher order polynomial interpolations could be used.

CCDs or other detectors with two or more color sensitivity (such as made of $Hg_{1-x}Cd_xTe$ with some of the pixels having x=0.2 and some pixels having x=0.3) may not need filters but still only sample in only one or both color channels and still may use the interpolations of the invention with subtraction to extract the other color channel from the sum.

The components in FIG. 6 could be combined in integrated circuits in various ways, and the detector and interpolator could be separated in space and time.

```
/*********************************************************************/
/*                                                                   */
/*   NAME:   direc_canny_c.c                                         */
/*                                                                   */
/*   DESCR: This program performs directional interpolation using the*/
/*          gradient direction. The gradinet direction is extracted from*/
/*          the luminance image.                                     */
/*                                                                   */
/*          Uses the grad orientation obtained by using Canny        */
/*          Version:   1.0                                           */
/*                                                                   */
/*********************************************************************/ include "rle.h"
include "image_io.h"
#include <stdio.h>
include <math.h> short  MIN, MAX;
short  THRESH;

void main(argc, argv)
int argc;
char *argv[];
{ int lflag = 0, oflag = 0, flag = 0;
  int l;
  char *infile = NULL;
  char *outfile = NULL;
  char *lumfile = NULL;
  char *gradfile = NULL;
  memory_image in_image, out_image, lum_image, edge_image, grad_image;
  int x, y, i, j;
  double h_1[4], h_2[4], sum, k, mag;
  unsigned char data[4];
  int   r0, r1, r2, r3, r4, r5, r6, r7, r8, didx, didy;
  long of;
  double angle, angle_rad, *grador;
  unsigned char *cptr;
  char cflag;

int nrc;
  int rows, cols;

/* canny's arguments */

FILE *fp;
  int windowsize = 9, eflag = 0;
  double sigma = 1.0, hfrac = 0.9, lfrac = 0.5;
  unsigned char *edgemap, *edgeptr;
  short *grad_mag, *magptr;/* array to store gradient magnitude */
  float *grad_orient, *orptr; /* array to store gradient orientation */ if (scanargs(argc, argv, "% L!-lumfile!s s%-sigma!F w%-windowsize!d h%-hfrac!F
             &lflag, &lumfile, &flag, &sigma, &flag,
             &windowsize, &flag, &hfrac, &flag, &lfrac, &eflag,
             &gradfile, &oflag, &outfile, &infile) == 0) {
```

Appendix

```
   fprintf(stderr,
           "performs directional interpolation on the input image\n");
   fprintf(stderr,
           "using the Canny gradient direction extracted from the lum. image\n");
   exit(-2);
 } if (load_image(lumfile, &lum_image)) exit(-1);
 if (load_image(infile, &in_image)) exit(-1);

if (lum_image.num_channels != 1) {
   printf("the lumfile should be single channel\n");
   exit(-1);} if (in_image.num_channels != 3) {
   printf("the input file should be a color image\n");
   exit(-1);} out_image.num_channels = in_image.num_channels;
 out_image.width = in_image.width;
 out_image.height = in_image.height;
 if (alloc_image(&out_image, strlen(in_image.comment) + 256)) exit (-1);

edge_image.num_channels = lum_image.num_channels;
 rows = edge_image.width = lum_image.width;
 cols = edge_image.height = lum_image.height;
 if (alloc_image(&edge_image, strlen(lum_image.comment) + 256)) exit (-1);

grad_image.num_channels = lum_image.num_channels;
 rows = grad_image.width = lum_image.width;
 cols = grad_image.height = lum_image.height;
 if (alloc_image(&grad_image, strlen(lum_image.comment) + 256)) exit (-1);

nrc = in_image.width * in_image.height;

/* allocate storage for the buffers  */

/* allocate memory to edgemap */ if( (grad_mag = (short *) malloc(nrc * sizeof(short))) == NULL) {
   fprintf(stderr, "Malloc Error; Allocating  grad_mag \n");
   exit(-1);}
 if( (grad_orient = (float*) malloc(nrc * sizeof(float))) == NULL) {
   fprintf(stderr, "Malloc Error; Allocating grad_orient\n");
   exit(-1);}
 if( (edgemap = (unsigned char *) malloc(nrc * sizeof(unsigned char )))
     == NULL) {
   fprintf(stderr, "Malloc Error; Allocating edgemap\n");
   exit(-1);}

/* compute and store the gradient info from the luminance image
    using Canny */ fprintf(stderr, "Computing Gradients using Canny\n");

fprintf(stderr,
         "sigma = %f lfraction = %f hfraction = %f windowsize = %d\n",
         sigma,lfrac,hfrac,windowsize);

canny(lum_image, windowsize, sigma, hfrac, lfrac,
       edgemap, grad_mag, grad_orient, 1);

fprintf(stderr,"Done\n");

/* save the edge map image */
```

```
edge_image.ptr[0] = edgemap;
if(addhist_image(argv, &in_image, &edge_image)) exit(-1);
if(save_image("edgefile", &edge_image)) exit(-1);

/* save the grad mag image */ scale_grad(nrc,grad_mag);

for(i=0;i<nrc;i++)
    *(grad_image.ptr[0]+i) = (unsigned char) *(grad_mag+i);

if(addhist_image(argv, &in_image, &grad_image)) exit(-1);
if(save_image("gradfile", &grad_image)) exit(-1);

/* intialize the out image to be all zero */ for(j=0;j<out_image.num_channels;j++)
  for (y = 0; y < out_image.height; y++){
    of = y*out_image.width;
    for (x = 0; x < out_image.width; x++)
      *(out_image.ptr[j] + of + x) = (unsigned char) 0;
  }

/* copy the scanned data from the in_image into the out_image */ for (y = 0; y < out_image.height; y++){
  of = y*out_image.width;
  for (x = 0; x < out_image.width; x++)
    {
       if( (x%3) == 0) /* fill with the red data */
         *(out_image.ptr[0] + of + x) =
           *(in_image.ptr[0] + of + x);

if( (x%3) == 1) /* fill with the green data */
         *(out_image.ptr[1] + of + x) =
           *(in_image.ptr[1] + of + x);

if( (x%3) == 2) /* fill with the blue data */
         *(out_image.ptr[2] + of + x) =
           *(in_image.ptr[2] + of + x);
    }
}

/* here comes the directional interpolation for each of the channels */ cflag = 'r';

fprintf(stderr,"Interpolating the 1st. Channel\n");
interpolate(1,cflag,out_image,in_image,grad_orient,grad_mag,edgemap);
fprintf(stderr,"Interpolating the 2nd  Channel\n");
interpolate(2,cflag,out_image,in_image,grad_orient,grad_mag,edgemap);

cflag = 'g';

fprintf(stderr,"Interpolating the 1st Channel\n");
interpolate(1,cflag,out_image,in_image,grad_orient,grad_mag,edgemap);
fprintf(stderr,"Interpolating the 2nd  Channel\n");
interpolate(2,cflag,out_image,in_image,grad_orient,grad_mag,edgemap);

cflag = 'b';

fprintf(stderr,"Interpolating the 1st Channel\n");
interpolate(1,cflag,out_image,in_image,grad_orient,grad_mag,edgemap);
fprintf(stderr,"Interpolating the 2nd  Channel\n");
```

```
     interpolate(2,cflag, out_image,in_image,grad_orient, grad_mag,edgemap);
     fprintf(stderr,"All Done\n");

/* If eflag set, write the grad_mag and grad_orient to a file */ if(eflag == 1)
       {
         if((fp = fopen(gradfile, "w")) == NULL)
           {
             fprintf(stderr, " Can't open gradient file %s \n", gradfile);
             exit(-1);
           }
         for(i = 0, edgeptr=edgemap,magptr=grad_mag,orptr=grad_orient;
             i < cols; i++)
           {
             for(j = 0; j < cols; j++,edgeptr++,magptr++,orptr++)
               {
                 /* if (*edgeptr == 255){ */ fprintf(fp,"%4d %4d %4d %7.2f\n", i,j,*magptr,*orptr);

/*}*/
               }
           }
         rclose(fp);
       } if (addhist_image(argv, &in_image, &out_image)) exit(-1);
     if (save_image(outfile, &out_image)) exit(-1);

}
Interpolate(flag,cflag,out_image,in_image,grador,grad_mag,edgemap)
     memory_image out_image,in_image;
     float *grador;
     short *grad_mag;
     int flag;
     char cflag;
     unsigned char *edgemap;
{
  int x,y,k,mod_flag;
  long of,pf;
  double angle,angle_rad, mag;
  unsigned char *cptr,*iptr;
  double I0,I1,I2,I3,I4,I5,I6,I_d1,I_d2,Nr,Dr;

if (cflag == 'r')
     {
        fprintf(stderr,"Interpolating Red\n");
        k = 0;
     }
  else if (cflag == 'g')
     {
        fprintf(stderr,"Interpolating Green\n");
        k = 1;
     }
  else if (cflag == 'b')
     {
        fprintf(stderr,"Interpolating Blue\n");
        k = 2;
     }
  else
     {
        fprintf(stderr,"Wrong cflag : %c\n", cflag);
        exit(-1);
```

```
} if( (cflag == 'r') && (flag == 1)) mod_flag = 1;
else if( (cflag == 'r') && (flag == 2)) mod_flag = 2;

else if( (cflag == 'g') && (flag == 1)) mod_flag = 2;
else if( (cflag == 'g') && (flag == 2)) mod_flag = 0;

else if( (cflag == 'b') && (flag == 1)) mod_flag = 0;
else if( (cflag == 'b') && (flag == 2)) mod_flag = 1;

else
   {
     fprintf(stderr,"Wrong mod_flag : %d\n",mod_flag);
     exit(-1);
   } fprintf(stderr,"mod_flag = %d\n",mod_flag);

for (x=0; x<out_image.width; x++)
   for (y=0; y<out_image.height; y++) {
     of = y*out_image.width + x;

if( *(grad_mag + of) > 0)
         angle = (double) *(grador + of);
     else
       angle= 0.0;

if (flag == 1) angle = -angle; /* for the first channel */
     angle_rad = angle*M_PI/180.0;
     if ( angle < 0.0) angle += 180.0; /* roll over if -ve */ cptr = out_image.ptr[k] + of;
     iptr = in_image.ptr[k] + of;
     mag = (double) *(grad_mag + of);

if (flag == 2) {

/* for the 2nd channel */

/* get the six image values */

I1 = (double) *(iptr - out_image.width - 2);
        I2 = (double) *(iptr - out_image.width + 1);
        I3 = (double) *(iptr - 2);
        I4 = (double) *(iptr + 1);
        I5 = (double) *(iptr + out_image.width - 2);
        I6 = (double) *(iptr + out_image.width + 1);
     } if (flag == 1)
        {
          /* for the 1st channel */

I1 = (double) *(iptr - out_image.width + 2);
          I2 = (double) *(iptr - out_image.width - 1);
          I3 = (double) *(iptr + 2);
          I4 = (double) *(iptr - 1);
          I5 = (double) *(iptr + out_image.width + 2);
          I6 = (double) *(iptr + out_image.width - 1);
        }

/* check if the gradient magnitude at this point is
        at least greater than THRESH, if so,
        select the appropriate relation depending on the
``` gradient orientation; note that we are actually using
the orientation of the edge (perp. to grad orie.) */

```
        if( x%3 == mod_flag)
          { if ( ( x == 94) && ( y == (out_image.height - 74)) )
              { pf = in_image.width*y + x;
                fprintf(stderr,"<%d %d>, %d %d %d %c %d\n",x,y,
                        *(in_image.ptr[0]+pf), *(in_image.ptr[1]+pf),
                        *(in_image.ptr[2]+pf),cflag,flag);
              } if( (0.0 <= angle) && (angle < 26.565051) ) {
              I_d1 = I4 + tan(angle_rad)*(I2 - I4);
              I_d2 = I3 + 2.0*tan(angle_rad)*(I5 - I3);
              I0 = (2.0*I_d1 + I_d2)/3.0;
              *cptr = (unsigned char)I0;} else if( (26.565051 <= angle) && (angle < 45.0) ) {
              I_d1 = I4 + tan(angle_rad)*(I2 - I4);
              I_d2 = (I5 + 2.0*I6 + (I5 - I6)/tan(angle_rad))/3.0;
              Nr = (I_d1*cos(angle_rad) + I_d2*sin(angle_rad));
              Dr = (cos(angle_rad) + sin(angle_rad));
              I0 = Nr/Dr;
              *cptr = (unsigned char)I0;} else if( (45.0 <= angle) && (angle < 135.0) ) {
              I_d1 = (I1 + 2.0*I2 + (I2 - I1)/tan(angle_rad))/3.0;
              I_d2 = (I5 + 2.0*I6 + (I5 - I6)/tan(angle_rad))/3.0;
              I0 = (I_d1 + I_d2)/2.0;
              *cptr = (unsigned char)I0;} else if( (135.0 <= angle) && (angle < 153.434949) ) {
              I_d1 = (I1 + 2.0*I2 + (I2 - I1)/tan(angle_rad))/3.0;
              I_d2 = (I4 + (I4 - I6)*tan(angle_rad));
              Nr = (-I_d1*cos(angle_rad) + I_d2*sin(angle_rad));
              Dr = (-cos(angle_rad) + sin(angle_rad));
              I0 = Nr/Dr;
              *cptr = (unsigned char) I0;} else if( (153.434949 <= angle) && (angle <= 180.0) ) {
              I_d1 = I3 + 2.0*tan(angle_rad)*(I3 - I1);
              I_d2 = I4 + tan(angle_rad)*(I4 - I6);
              I0 = (2.0*I_d2 + I_d1)/3.0;
              *cptr = (unsigned char)I0;} else fprintf(stderr,"Oops bottomed out %f %d %d\n",angle,x,y);
          }
      }
  } scale_grad(nrc,grad_mag)
      int nrc;
      short *grad_mag;
{
  short MIN,MAX, val, range;
  int i;

MIN = MAX = *grad_mag;

for(i=1;i<nrc;i++)
     { if(*(grad_mag+i) < MIN) MIN = *(grad_mag+i);
```

```
      if(*(grad_mag+i) > MAX) MAX = *(grad_mag+i);
   }

THRESH = (short) ((float)(MIN + MAX))/3.0;
  fprintf(stderr,"MIN = %d MAX = %d THRESH = %d\n",MIN,MAX,THRESH);

range = MAX - MIN;

for(i=0;i<nrc;i++)
     {
       val = *(grad_mag+i);
       if(val < THRESH) *(grad_mag+i)= 0;
       else   *(grad_mag+i) = (short) (255.0*(float)(val - MIN)/(float)range);
     }

}
```

What is claimed is:

1. A color camera, comprising:

an image detector, said detector with sets $S_1, S_2, \ldots S_N$ of pixels for N an integer greater than 1, wherein said pixels in a set $S_J$ detect radiation in a corresponding sampled channel $C_J$ for each integer J in the range 1 to N; and a channel reconstructor coupled to an output of said detector, said reconstructor including:

a luminance generator which combines said sampled channel $C_J$ for each integer J in the range 1 to N to a luminance channel, a gradient generator coupled to an output of said luminance generator and which transfers said luminance channel to a gradient channel, and a directional interpolator coupled to an output of said detector and to an output of said gradient generator and which transfers each of said sampled channel $C_J$ for each integer J in the range 1 to N to a corresponding reconstructed channel $RC_1, RC_2, \ldots RC_N$; and an output of the channel reconstructor.

2. The color camera of claim 1, wherein:

said luminance generator is a programmed digital signal processor;

said gradient generator is said programmed digital signal processor; and said directional interpolator is said programmed digital signal processor.

3. The color camera of claim 1, wherein:

said luminance generator includes a sampled channel interpolator and an interpolated channel adder.

4. The color camera of claim 1, wherein:

N equals 3.

5. A method of interpolating sampled color channels, comprising the steps of:

forming a luminance channel from two or more sampled color channels;

extracting a gradient channel from said luminance channel; and directionally interpolating each of said sampled color channels according to said gradient channel.

6. The method of claim 5, wherein:

said forming a luminance channel includes forming a linear interpolation of each of said sampled color channels followed by weighted summing of said linear interpolation from said forming a linear interpolation.

7. The method of claim 5, comprising the further steps of:

after said step of forming a luminance channel, at each pixel meauring local variation of said luminance channel, and when said local variation at a pixel is greater than a threshold, said step of directionally interpolating interpolates at said pixel perpendicular to a direction of said gradient channel at said pixel, and when said local variation at a second pixel is less than said threshold, said step of directionally interpolating interpolates linearly at said second pixel.

8. The method of claim 5, wherein:

said step of extracting a gradient channel includes quantizing gradient directions of gradients formed, and replacing a gradient direction at a pixel with a dominant gradient direction in a neighborhood of said pixel.

9. The method of claim 5, wherein:

said sampled color channels are images with vertical stripes of sampled pixels alternating with vertical stripes of unsampled pixels; and said step of forming a luminance channel includes forming a horizontal interpolation channel from each of said sampled color channels followed by summation of said horizontal interpolation channels.

10. A color camera for images in a class, comprising:

an image detector, said detector with sets $S_1, S_2, \ldots S_N$ of pixels for N an integer greater than 1, wherein said pixels in a set $S_J$ detect radiation in a corresponding Jth channel for each integer J in the range 1 to N; and an interpolator coupled to an output of said detector, said interpolator including a first pattern recognizer trained on images in a first class, said pattern recognizer with inputs being N sampled channels corresponding to said pixels in said sets $S_J$ and outputs N interpolated channels.

* * * * *